Aug. 12, 1969  J. F. NORTON  3,460,801
VALVED FLUID COUPLING OR CONDUIT
Filed July 25, 1966  2 Sheets-Sheet 1

INVENTOR.
JAMES FREDERICK NORTON
BY
Hoffmann and Yount
ATTORNEYS

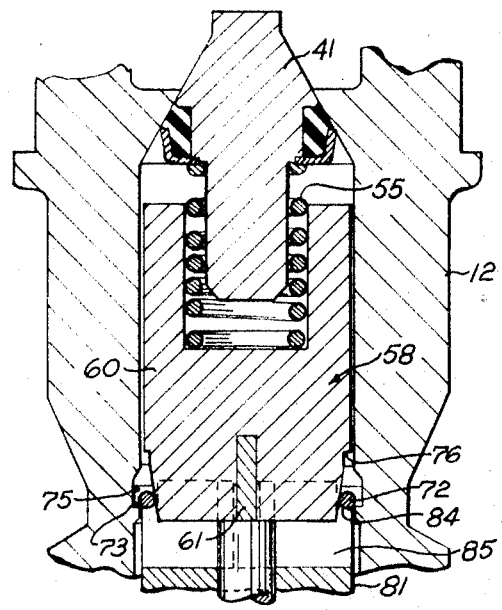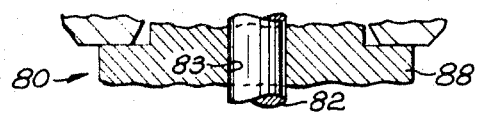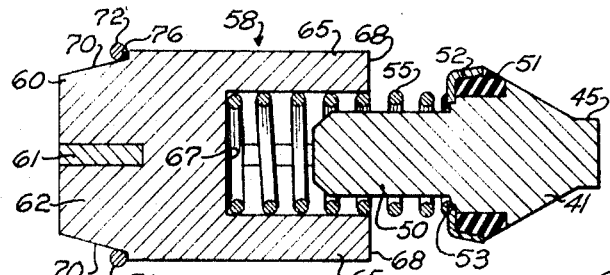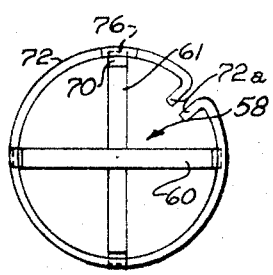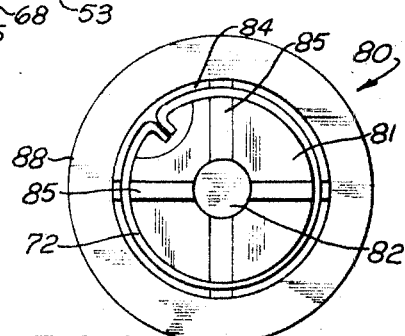

United States Patent Office 3,460,801
Patented Aug. 12, 1969

3,460,801
VALVED FLUID COUPLING OR CONDUIT
James Frederick Norton, Cleveland, Ohio, assignor to The Hansen Manufacturing Company, Cleveland, Ohio, a corporation of Ohio
Filed July 25, 1966, Ser. No. 567,517
Int. Cl. F16l 37/28, 37/22
U.S. Cl. 251—149.6                                  13 Claims

ABSTRACT OF THE DISCLOSURE

A valved coupling in which a valve is supported in a spring received in a recess defined by the legs of two U-shaped plates disposed at right angles to each other with the plates having tapered surfaces at the end remote from the recess which engage and expand an expansible member over a shoulder in a conduit in which the valve is positioned. The valve has a stem which is closely received by the spring inside the recess, the spring fits in the recess so as to provide a guide for the valve.

---

The present invention relates to valved fluid couplings and other valved fluid conduits, and more particularly to a fluid line coupling or other fluid conduit having a valve means mounted within its flow passage and which includes a valve member biased to a closed position by a spring and a support and reaction member for supporting the spring and valve member. The present invention also relates to a method for assembling such a valve means within a fluid conduit.

An object of the present invention is to provide a new and improved valved fluid coupling or other fluid conduit of the character described in which the reaction member for the spring for biasing the valve to a closed position and its mounting are such that the reaction member can be readily mounted within, and preferably dismounted from, the conduit and when mounted within the conduit is such that it is adapted to take relatively high spring pressures with little or no danger of being dislodged.

A further object of the present invention is to provide a new and improved valved fluid coupling or other fluid conduit of the character described above in which the biasing spring for biasing the valve member to a closed position provides a biasing force for wedging the reaction member for the spring into a member for holding it in the conduit.

A further object of the present invention is to provide a new and improved valved fluid line coupling or other fluid conduit of the character described in which the biasing spring for closing the valve operates through its reaction member to expand a ring member over a shoulder in the conduit to hold the reaction member in position within the conduit.

A still further object of the present invention is to provide a new and improved fluid coupling or other fluid conduit in which a self-closing valve means has a valve member which is supported and guided entirely by the spring disposed in a recess defined by spaced fingers of a reaction member for holding the spring in position in the conduit.

Another object of the present invention is to provide a new and improved fluid coupling or other fluid conduit in which the valve means has a valve member including a stem portion which is slidably received in close fitting relationship with a spring which in turn is slidably received into close fitting relationship with a support and reaction member or backstop and wherein the valve member is guided for movement solely by the spring.

A further object of the present invention is to provide a new and improved method for assembling a valve means of the character defined in the preceding objects within a fluid conduit or coupling having a valve seat and an annular recess axially spaced from the valve seat, and in which the conduit and backstop of the valve means are relatively moved axially toward one another to compress the spring between the backstop and valve member upon the latter engaging the valve seat and to position the recess adjacent the split ring surrounding the wedging means of the backstop, and in which the backstop is then released, while axial displacement of the split ring is prevented, to allow the spring to move the backstop rearwardly whereby the wedging means on the backstop radially expands the ring into the annular recess to hold the valve means within the conduit.

The present invention resides in certain novel constructions, combinations and arrangement of parts and further objects and advantages thereof will be apparent to those skilled in the art to which the invention relates and from the following detailed description of the preferred embodiment thereof described with reference to the accompanying drawings, in which similar reference characters designate corresponding parts throughout the several views and in which:

FIG. 3 is an enlarged sectional view of part of the coupling shown in FIG. 1;

FIG. 4 is an end elevational of the part of the coupling shown in FIG. 4;

FIG. 5 is an enlarged fragmentary sectional view of part of the coupling shown in FIG. 1 and showing the manner in which the valve means is mounted therein; and FIG. 6 is a top plan view of a tool means employed for mounting the valve means in the coupling.

Figure 1:
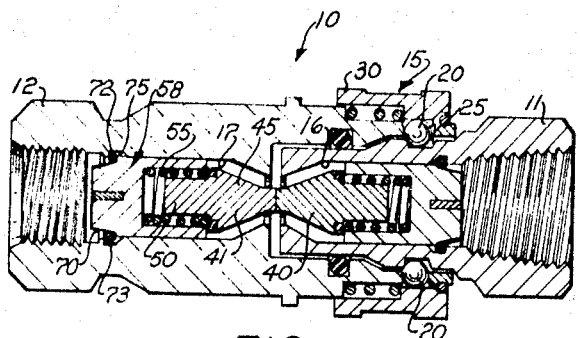
FIG. 1 is an axial cross-sectional view of a valved quick-connective coupling embodying the present invention and showing the relative position of the parts when connected.

Although the provisions of the present invention may be employed in various types or kinds of valved fluid conduits, they are especially adapted for use in valved fluid couplings, and for the purposes of illustration are herein shown as embodied in a valved quick-connective type fluid coupling.

Referring to the drawings, a valved quick-connective coupling embodying the present invention is there shown, and generally designated by reference numeral 10. The quick-connective coupling 10 comprises a male or plug member 11 which is adapted to be inserted into a female or socket member 12 and to be connected or coupled thereto by a coupling mechanism 15 carried by the socket member 12. The plug and socket members 11 and 12 have axial bores or passages 16 and 17, respectively, therethrough which communicate with each other when the coupling members 11 and 12 are connected. The bore 17 is enlarged at the outer or forward end of the socket member 12, the right end as viewed in FIG. 1, to provide a socket opening 18 for receiving the forward end of the plug member 11.

Figure 2:
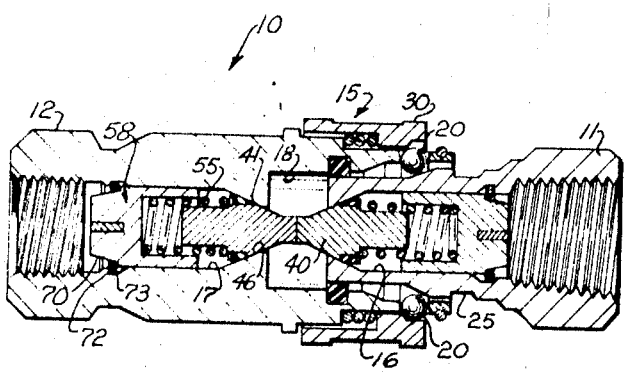
FIG. 2 is an axial cross-sectional view of the valved quick-connective coupling shown in FIG. 1 and illustrating the parts in a different position.

The coupling mechanism 15 for coupling the plug member 11 to the socket member 12 may be of any suitable or conventional construction and is here shown as including a plurality of detents or balls 20 movably supported in individual circumferentially spaced openings in the socket member 12. The balls 20 have an inner locking position in which they project inwardly of the side wall of the socket opening 18 and are received in an external circumferentially extending annular groove 25 in the plug member 11 to couple the plug member 11 to the socket member 12. The coupling mechanism 15 further includes a spring biased locking sleeve 30 for normally retaining the balls 20 in their locking position, as shown in FIG. 1. The sleeve 30 is adapted to be manually moved in a conventional manner from its normal position, as shown in FIG. 1, to a retracted position, as shown in FIG. 2, in which the balls 20 are free to move outwardly of their openings to clear the groove 25 and allow the plug member 11 to be disconnected from and inserted into a socket member 12.

In the illustrated embodiment, the plug and socket members carry valve members 40 and 41, respectively, which are automatically movable to a closed position on disconnection of the coupling. The valve members engage each other and are moved to an open position to communicate the passages 16 and 17 with each other when the plug member 11 is inserted into the socket member 12. The valve members 40 and 41 are of an identical construction in the illustrated embodiment, and are removably mounted within the plug and socket members 11 and 12, respectively, in the same manner, and therefore only the construction and the manner in which the valve member 41 is removably mounted in the socket member 12 will be described in detail.

The valve member 41 is normally biased to a closed position in which it engages a cooperating annular axially tapered valve seat 46 here shown as being formed integral with socket body 12 adjacent its forward end. The valve member has a tapered head portion 45 and a rearwardly extending stem portion 50. The head portion 45 has a sealing ring 51 which is adapted to engage the annular valve seat 46 to provide a seal and prevent leakage of fluid from the flow passage 16 therepast when the valve member 41 is in its closed position. The sealing ring 51 is disposed in a cut out in the rear of the head portion 45 and is held in position by a retainer 52 which is slidably received on the stem portion 50 and is biased against the sealing ring 51 by a spring 55.

The valve member 41 is biased toward its closed position by the helical compression spring 55. The spring 55 surrounds the stem portion 50 and has one end in abutting engagement with the retainer 52, and the other end in abutting engagement with a backstop or spider 58.

The backstop 58 forms a combined support, guide and reaction means for the valve member 41 and as best shown in FIG. 4, is X-shaped in cross section. The backstop 58 comprises a pair of interlocking, flat U-shaped plates 60 and 61 which extend at right angles to one another. Each of the U-shaped plates 60 and 61 have a width such that they are receivable within the bore or flow passage 17 and comprise a bottom portion 62 and a pair of spaced parallel legs 65 projecting forwardly toward the valve seat 46. The plates 60 and 61 have complementary slots at their rearward and forward ends of their bottom portions respectively, to enable the plates 60 and 61 to be interdigitated to effect their interlocking engagement.

The forwardly projecting legs 65 of the U-shaped plates 60 and 61 define a support and guide means for supporting the spring 55 and for guiding its movement when it is expanded and contracted during closing and opening movements of the valve member 41. The forward facing surfaces 67 of the bottom portions 62 of the U-shaped plates form a cross-shaped abutment against which the rearward end of the compression spring 55 bears and the forwardly facing end surfaces 68 of the legs form a stop for the head portion 45 of the valve member and serve to square the valve member 41 so that it is maintained concentrically positioned within the flow passage 17 when in its open position, as shown in FIG. 1. The compression spring 55 is slidably received between the legs 65 of the backstop 58 in close fitting relation therewith.

The valve member 41 is supported and guided for axial movement relative to the valve seat 46 solely by the spring 55; thereby eliminating the need for a backstop construction which directly guides either the stem portion or the head portion of the valve. As best shown in FIG. 1, the rearwardly extending stem portion 50 of the valve member 41 is slidably received within the compression spring 55 in a close fitting relationship therewith and is supported by the spring 55 in a spaced relationship with respect to the legs 65 and the abutment surface 67 of the backstop 58. The support and guide arrangement for the valve member 41 and the construction of the backstop 58 minimizes obstruction to fluid flow through the passage 17 and the construction and arrangement of the backstop 58 is such that it is effective to withstand high thrust and reaction forces, and therefore is especially advantageous for use where a strong biasing spring is desirable or when connection is necessary against high back pressure in the other coupling member.

The backstop 58 is removably mounted or held within the socket member 12 in a novel manner which minimizes the possibility that the backstop 58 may become dislodged, even when a strong biasing spring is employed. As shown in the drawings, the bottom portions 62 of the U-shaped plates 60 and 61 have tapered side surfaces 70 at their rearward ends which are axially divergent proceeding from the rearward or left end of the backstop 58 toward the forward or right end thereof, as viewed in FIG. 1. The tapered surfaces 70 are here shown as being linear and form a wedge surface or means for engaging and radially expanding a split ring 72 surrounding the rearward end of the backstop 58 over a shoulder 73 defined by the side wall of an annular internal groove or recess 75 in the socket member 12 in response to movement of the backstop in a rearward direction by the spring 55. The backstop 58 cannot move forwardly to release the split ring 72 when the coupling is connected, since the valve members 40 and 41 are then positioned so as to be in abutting engagement with or approximate abutting engagement with the end faces 68 of the legs 65 of the backstop 58.

The split ring 72 is here shown as being of a circular cross-section and has a normal diameter which is less than the diameter of the passageway 17. The split ring 72 has inwardly turned ends 72a so that the split between these ends will not be aligned with one of the shoulders 76 on the backstop 58. The split ring 72 is radially expanded by the wedge surfaces 70 to a diameter greater than the diameter of the passage 17 and into the recess 75. The U-shaped plates 60 and 61 have a shoulder 76 at the forward end or adjacent the forward end of the wedge surfaces 70 for engaging the split ring 72 to limit the extent to which it is radially expanded and for positioning the same against the shoulder 73. The split ring 72 is maintained in its radially expanded state in which it abuts the shoulders 73 and 76 to hold or retain the backstop 58 within the coupling member 12 by the wedge surfaces 70 due to the rearward biasing force exerted by the spring 55. The radial depth of the recess 75 is preferably such that the split ring 72 will just touch or be spaced slightly from the bottom thereof when in engagement with the shoulder 76. The shoulder 73 could be formed by a radially extending abutment rather than as a side wall of a recess, if desired.

From the foregoing, it should be apparent that the forces exerted against the backstop 58 by the compression spring 55 causes the backstop to be constantly biased toward the left, as viewed in FIG. 1, and that the provision of the wedge surfaces 70 constantly maintains the split ring 72 in a radially expanded position within the groove 75. It should be further apparent that the manner in which the backstop 58 is held or mounted within the socket member 12 is highly effective to prevent dislodgement thereof even when strong biasing springs are employed.

The present invention further provides a novel method for enabling the valve member 41 to be readily assembled or mounted within and disassembled from the socket member 12. The method, in the preferred embodiment, is carried out with the aid of a tool means 80 comprising an annular support member 81 and a pin 82 slidably received in an axial through opening 83 in the member 81. The member 81 has an annular shoulder 84 adjacent its upper end, as viewed in FIG. 5, for supporting the split ring 72 and is cross-slotted, as best shown in FIG. 6, at its upper end. The slots 85 extend diametrically and intersect each other at a right angle and have a depth which is greater than the length of the tapered surfaces 70 on the backstop 58.

To assemble the valve member 41 within the socket member 12, the split ring 72 is placed on the annular shoulder 84 of the member 81 and the rearward end of the cross members 60 and 61 of the backstop 58 for the valve member 41 are disposed within the cross-slots 85 of the member 81. The wedge surfaces 70 of the backstop 58 are disposed within the split ring 72 and the backstop 58 is limited against movement to the bottom of the cross-slots by a central pin 82. The pin can be released to move axially to allow the backstop 58 to move downwardly in the cross-slots 85, after the valve means is placed on the split ring 72, the pin 82 is moved upwardly, as viewed in FIG. 3, to engage the rearward end of the backstop 58. It must be clear that the pin can be moved relative to member 81 or vice versa.

The socket member 12 is axially aligned with the valve member 41 and then positioned over the valve member 41 by axially moving the same downwardly thereover with the valve member 41 entering the bore 17 from its end remote from the valve seat 46. As the socket member 12 is moved downwardly over the valve member 41, the valve seat 46 engages the valve member 41 and causes the spring 55 to be compressed, since downward movement of the backstop 58 is prevented by the pin 82. The socket member 12 is moved downwardly until its lower end, as viewed in FIG. 5, engages an annular flange 88 on the member 81. When this occurs, the recess 75 is disposed immediately radially outwardly of the split ring 72. When the socket member 12 is so positioned, the pin 82 is removed whereupon the spring 55 moves the backstop 58 downwardly in a direction away from the valve seat 46 with the wedge surfaces 70 thereof causing the ring 72 to be expanded radially into the groove 75 until the ring 72 engages the shoulder 76 whereby the backstop 58 is held within the socket member 12.

To disassemble or remove the valve member 41 from the socket member 12, the socket member 12 with the valve member 41 therein is positioned over the tool means 80 until the lower end of the socket member engages the flange 88, in which position the groove 74 is located outwardly of the shoulder 84. The pin 82 is then inserted through the axial opening 83 to engage and move the backstop 58 toward the valve seat 46 in opposition of the bias force of the spring 55. When the backstop has been moved to the position shown in FIG. 5, the split ring 72 will contract around the peripheral side portion of the upper end of the member above the shoulder 84. The socket member 12 can then be removed from tool member 80 with the valve member 41 passing through the bore 17 of the socket member 12 and remaining on the tool means 80. Alternatively, any suitable plunger type tool could be employed to move the backstop 58 toward the valve seat 46 in opposition to the biasing force of the spring 55 to allow the split ring 72 to contract and then be removed. The backstop 58, spring 55 and valve member 41 can then be readily removed from the bore of the socket member 12, as by gravity.

From the foregoing it can be seen that a novel fluid line coupling or other conduit having a valve member removably mounted therein which includes a backstop of a simple, high strength construction, and which provides a minimum resistance to fluid flow through the fluid line and which is mounted therein in such a manner that dislodgement thereof is prevented has been provided. It should be apparent from the foregoing that a novel fluid coupling or other conduit having a valve member therein provided with a backstop having wedge surfaces thereon for expanding a split ring into an annular groove in the coupling or other conduit has been provided.

While the preferred embodiment of the present invention has been described in considerable detail, it will be apparent that the invention is not limited to the construction shown that it is my intention to cover hereby all adaptations, modifications and changes therein which come within the practice of those skilled in the art to which the invention relates in the scope of the appended claims.

What I claim is:

1. A valved fluid conduit comprising: a body member having a flow passage therethrough and a valve seat, a valve assembly positioned within said flow passage, said valve assembly comprising a movable valve member, a backstop means slidably received within said flow passage and spaced from said valve seat, and a compression spring having one end in abutting engagement with said backstop means and the other end in abutting engagement with said valve member for biasing said valve member toward said valve seat, said body member having a radially inwardly extending shoulder thereon, and a radially expandable member slidably carried by said backstop means and which is cooperably engageable with the shoulder for holding said valve assembly in its position within the body member; said backstop means including wedge means for radially expanding said member over the shoulder in response to movement of said backstop means away from asid valve seat by the compression spring.

2. A valved fluid conduit, as defined in claim 1 and wherein said radially expandable member is a split ring having a normal diameter when free of any externally imposed forces which is less than the diameter of said flow pasage in said body member.

3. A valved conduit, as defined in claim 2, and wherein said wedge means comprises tapered surfaces on said backstop means which are axially divergent proceeding from the rearward end of said backstop means toward said valve seat.

4. A valved fluid conduit, as defined in claim 1, and wherein said backstop means comprises a pair of interlocking U-shaped plates disposed at right angles to one another.

5. A valved fluid conduit, as defined in claim 4, wherein said wedge means comprises tapered surfaces on the sides of said U-shaped plates which are axially divergent proceeding from the rearward end of said plates toward said valve seat.

6. A valved fluid conduit, as defined in claim 2, wherein said backstop has a radially extending shoulder which engages said radially expandable member and holds the latter against the shoulder on said body member.

7. A valved fluid conduit, as defined in claim 1, and wherein said conduit is a fluid coupling.

8. A valved conduit, as defined in claim 1, and wherein said shoulder is a side wall of an annular recess in said body member.

9. A valved fluid conduit comprising: a body member having a flow passage therethrough and a valve seat at its forward end, a backstop mounted in said body member and spaced rearwardly from said valve seat, said backstop having an abutment surface extending transversely of said flow passage and a plurality of legs projecting forwardly toward said valve seat, a valve member having a rearwardly extending stem disposed between but spaced radially inwardly of said legs of said backstop, a compression spring surrounding said valve stem and having one end in abutting engagement with said abutment surface of said backstop and the other end in abutting engagement with said valve member for biasing said valve member toward said valve seat, said compression spring being slidably received between the legs of said backstop and in a close fitting relationship therewith whereby said legs of said backstop function at the guide for said spring, said valve stem of said valve member being slidably received in said spring in a close fitting relationship therewith and said valve member being guided for movement by said spring.

10. A valved fluid conduit, as defined in claim 9, and wherein said rearwardly extending valve stem terminates at a location spaced forwardly of said abutment surface on said backstop.

11. A valved fluid conduit, as defined in claim 9, and wherein said body member has an inwardly facing recess surrounding the rearward end portion of said backstop, a radially expandable member slidably carried by said backstop means and which is cooperably engageable with a side wall of said recess for retaining said valve assembly in its position within the body member, said backstop including wedge means for radially expanding said radially expandable member into said recess in response to movement of said backstop means away from said valve seat by the compression spring whereby the valve assembly is securely mounted within the body member.

12. A method of assembling a valve means, which includes a valve piece, a backstop provided with wedge means, and a spring interposed between the valve piece and backstop, within a fluid conduit having a valve seat and an inwardly facing shoulder axially spaced from the valve seat comprising the steps of: disposing the wedge means of said backstop of said valve means through a radially expandable split ring, holding said split ring and backstop against relative axial movement, relatively moving said conduit and said backstop of said valve means axially toward one another until said valve piece engages said valve seat of said conduit, continuing said relative movement of said backstop toward and said conduit to compress the spring of said valve means and until the shoulder in said conduit member is disposed behind said radially expandable split ring, releasing the backstop while preventing axial displacement of the radially expandable split ring whereby the spring moves the backstop away from the valve seat and the wedging means expands the radially expandable member over the shoulder to hold the valve means within the fluid conduit.

13. A valved fluid conduit comrising: a body member having a flow passage therethrough and a valve seat at its forward end, a backstop mounted in said body member and spaced rearwardly from said valve seat, said backstop having an abutment surface extending transversely of said flow passage and means projecting forwardly toward said valve seat and defining a recess having guide surfaces on opposite sides of the axis of said passage extending parallel to said axis, a valve member having a rearwardly extending stem disposed between but spaced radially inwardly of said guide surfaces of said backstop, a compression spring surrounding said valve stem and having one end in abutting engagement with said abutment surface of said backstop and the other end in abutting engagement with said valve member for biasing said valve member toward said valve seat, said compression spring being slidably received in said recess and in a close fitting relationship with guide surfaces whereby said guide surfaces of said backstop function as the guide for said spring, said valve stem of said valve member being slidably received in said spring in a close fitting relationship therewith and said valve member being guided for movement by said spring and unguided by said backstop.

References Cited

UNITED STATES PATENTS

| | | | |
|---|---|---|---|
| 3,002,528 | 10/1961 | Leissner | 137—543.19 |
| 3,174,508 | 3/1965 | Zahuranec | 137—614.04 |

WILLIAM F. O'DEA, Primary Examiner

HOWARD M. COHN, Assistant Examiner

U.S. Cl. X.R.

29—157; 137—543, 614